Feb. 29, 1944. E. H. PATRICK 2,342,751
QUICK-RELEASE SPEED GOVERNOR FOR AUTOMOTIVE VEHICLES
Filed Oct. 5, 1942
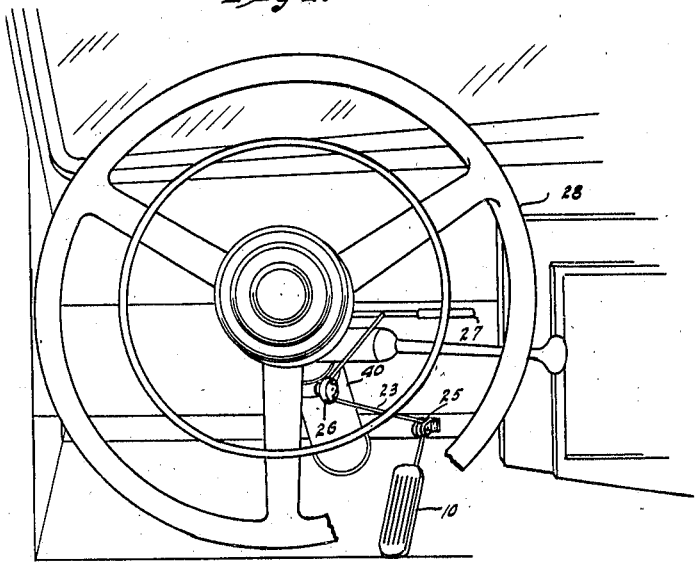
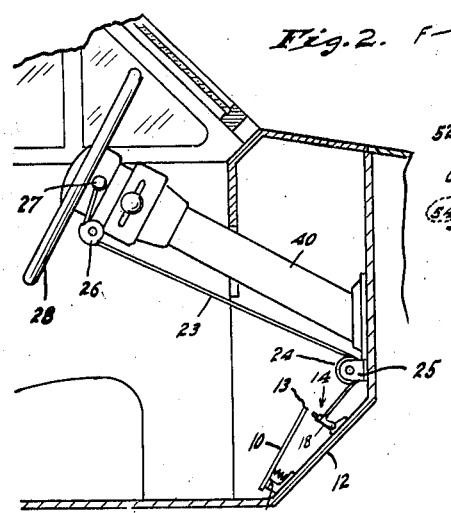
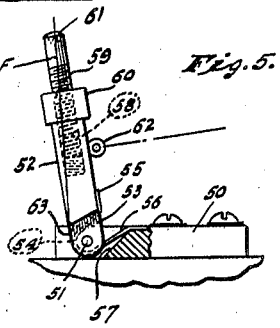
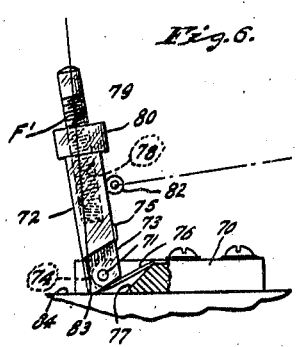
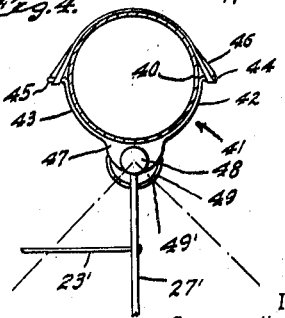
INVENTOR.
Earnest H. Patrick,
BY
Hood & Hahn
ATTORNEYS.

Patented Feb. 29, 1944

2,342,751

UNITED STATES PATENT OFFICE 2,342,751

QUICK-RELEASE SPEED GOVERNOR FOR AUTOMOTIVE VEHICLES

Earnest H. Patrick, Indianapolis, Ind.

Application October 5, 1942, Serial No. 460,836

12 Claims. (Cl. 74—526)

The present invention relates to quick-release speed governing and limiting devices for automotive vehicles. Broadly stated, the primary object of the invention is to provide a device of the character above suggested which will normally limit the speed of an automotive vehicle to a value not in excess of a legal speed, which will prevent such rapid acceleration of the vehicle as will cause undue wear on the tires thereof; and which nevertheless may be very readily and instantaneously thrown entirely out of operation, in order to give to the vehicle operator the advantage of rapid acceleration or high speed or both to extricate himself from a contingency of traffic in which the limitations on the engine of the vehicle normally placed thereon by the limiting mechanism might readily result in an accident.

Further objects of the invention will appear as the description proceeds.

Under the circumstances in which the country finds itself at the present time, all operators of motor vehicles have been called upon to conserve tires and to conserve fuel by every possible means. Specifically, vehicle operators have now been requested to place an absolute limit upon maximum speed at 35 miles per hour. It is a recognized engineering fact that most road vehicles operate at substantially maximum efficiency, with regard to fuel consumption, at speeds approximating 35 miles per hour; and no doubt most drivers will make a real effort to limit vehicle speeds to that value.

However, most drivers who are in the habit of operating vehicles on highways, are in the habit of running at much greater speeds; and constant concentration is required, for those drivers, to hold vehicle speeds down. Unconsciously, an operator who is in the habit of driving at 75 or 80 miles per hour will allow the speed of the vehicle to inch upwardly, and frequently he will fail to notice the fact that he is exceeding his intended speed limit until his speed reaches a value of 50 or 60 miles per hour.

Therefore, it is desirable to provide means which, normally, will positively prevent the driver from depressing his accelerator pedal so far as to carry his vehicle speed above the desired maximum; and according to the present invention, I therefore provide a stop or abutment means, normally positioned below the free end of the standard pivoted accelerator pedal, and adjustable to assume a position such as to stop the accelerator pedal at a point which corresponds to a desired maximum vehicle speed.

A further driving habit, which cannot well be supervised by law enforcement officials, and which is extremely wasteful of fuel and tires, is the practice of "jumping" away from traffic stops. Millions of vehicle operators have an almost uncontrollable tendency to see how fast they can get away from a traffic light—to outdistance all other vehicles which have been stopped by the same traffic light. With the transmission gearing set for "low speed drive," these operators will depress the accelerator pedal "to the floor," racing their engines, burning ridiculous quantities of fuel, subjecting the engine to excessive wear, and placing a terrific grinding stress upon the road engaging surfaces of their tractive tires. Through "intermediate drive," and then into direct drive, these drivers go through the same procedure, giving their engines full throttle during the entire period of acceleration to their desired cruising speeds.

This practice, too, is prevented by the device of the present invention, which positively stops the accelerator pedal at a point far short of full throttle, enforcing a gradual acceleration through the various phases of the transmission, and to desired cruising speed.

But a device of this character, if inflexible, has been found to be actually dangerous in use. Particularly if the vehicle is in the hands of an operator who is accustomed to handling a powerful vehicle without such limitations, the driver will frequently find himself in a tight spot. On the road, for instance, he overtakes a more slowly moving vehicle and starts to pass, thinking that he has time enough. If, however, he is running at top governor speed, and another vehicle is approaching from the opposite direction, and if the driver miscalculated the relative speed of the three vehicles involved, he may find that his passing time is short. If he cannot urge his vehicle to higher speed, a collision may frequently result.

Furthermore, in the more densely populated sections of the country, there are frequently occasions when traffic conditions will permit passing a vehicle which is moving only a few miles per hour slower than that of the operator in question, if the passing can be effected relatively quickly; whereas if the vehicle in question is absolutely limited to a maximum speed of 35 miles per hour, he may have to follow for miles behind a vehicle moving 32 miles per hour before an occasion arises when the passing lane is open far enough to permit the relative slow passing maneuver.

For these reasons, I consider it essential to provide means, readily and conveniently and instantaneously manipulable by the vehicle operator, to throw the speed limiting device entirely out of operation. I therefore provide a lever, so positioned as to be manipulable by the fingers of one hand of the operator while that hand engages the steering wheel of the vehicle, to render the speed limiting device of my invention operative.

It is desirable, of course, to add as little as possible to what the vehicle operator has to think about. In the preferred embodiment of my invention, therefore, the means whereby the speed limiting device is thrown out of operation is so arranged that, in almost every instance, the speed limiting device will be thrown back into operation automatically after the momentary crisis or emergency has passed.

The occasion on which most frequently it will be desirable to throw the speed limiting device out of operation involves the passing of another vehicle. Certain present day automobiles are provided with a device for signalling to surrounding traffic the intention of the vehicle operator to turn in one direction or the other. Most of these devices are so arranged that, when set by the operator to indicate his intention to turn in one direction, they will continue to signal that intention until after the turn has been made and the operator begins to straighten up his steering wheels. Ideally, I so connect my throwout device for the speed limiting mechanism that such device will be rendered inoperative by the actuation of the signalling mechanism to indicate a left turn. Thus, as the operator of a vehicle equipped with my mechanism overtakes another vehicle, he will actuate his signalling mechanism to indicate his intention to turn out to the left. Through a suitable mechanical train, the actuation of that signalling mechanism will render the speed limiting device inoperative. The vehicle operator now depresses the accelerator and swings to the left to begin the passing movement. As the straightens his steering wheel after having moved sufficiently to the left, the signalling mechanism actuator is automatically returned to neutral position; and thereby my speed limiting device is left in a condition such that, the moment the accelerator pedal is again released, the speed limiting mechanism will again come into operative position without further attention on the part of the operator.

To the accomplishment of the above and related objects, my invention may be embodied in the forms illustrated in the accompanying drawing, attention being called to the fact, however, that the drawing is illustrative only, and that change may be made in the specific constructions illustrated and described, so long as the scope of the appended claims is not violated.

Fig. 1 is a substantially isometrical view of the steering wheel, steering post, associated levers, accelerator pedal, and the control mechanism for my speed limiting device;

Fig. 2 is a side elevation of the above elements;

Fig. 3 is an enlarged section through the blocking mechanism;

Fig. 4 is a substantially horizontal section through a vehicle steering post, showing means for mounting a control element thereon;

Fig. 5 is a view similar to Fig. 3 but showing a modified form thereof; and

Fig. 6 is a similar view showing a still further modification.

Referring more particularly to the drawing, it will be seen that I have illustrated a standard type of accelerator pedal 10 which is pivotally supported at 11 upon a suitable bracket and held normally, by a spring 12, with its free end 13 in an elevated position. Mounted beneath the free end 13 of the accelerator pedal 12 is my blocking mechanism, indicated generally by the reference numeral 14.

Said mechanism comprises a base unit 15 suitably secured to the vehicle floor by screws or rivets 16, or other suitable fastenings. Said base unit comprises upstanding flanges between which is mounted a journal pin 17 upon which is pivotally secured an arm 18 providing an upper platform 19 at its free end. A threaded pin 20 is threadedly received in a suitable threaded aperture 21 in said platform 19 and preferably carries a lock nut 22. It will be obvious that the pin 20 is adjustable axially upon a line substantially perpendicular to the axis of the pivot pin 17, and may be locked in any suitable position of adjustment by the lock nut 22. Thereby, the blocking unit can be set to stop engine-accelerating movement of the free end 13 of the accelerator pedal at any desired position of adjustment within a predetermined range.

One end of a flexible control connection 23 is secured to the arm 18 in any suitable manner. The element 23 may be a metal cable, or may be a cord of any suitable material. There are available cords formed of synthetic plastic materials which serve the function of the connector 23 very satisfactorily. The essential criterion of the connector 23 is that it shall be of such character as to be capable of applying a motion-transmitting force to the arm 18 in one direction only.

As is clearly shown in Figs. 1 and 2, the cord 23 passes from the arm 18 around a pulley 24 mounted in a suitable bracket 25 which may preferably be carried on the vehicle dash board, thence around a pulley 26 supported upon the steering post of the vehicle, and so to an operating lever 27.

As illustrated, the operating lever 27 is the actuator for the direction indicating signalling device which is standard equipment on some automobiles. It will be seen that the connection is such that, when the actuator 27 is shifted to cause the signalling mechanism to warn of a left turn, the connector 23 will be operated to swing the arm 18 in a clockwise direction as viewed in Fig. 3. It will also be seen that such movement of the arm 18 will swing the same out of blocking relation with the accelerator pedal 10; and that the surface of said arm presented toward the accelerator is of such character that, if the actuator 27 is returned to neutral position (or to a position indicating a right turn) at a time when the accelerator is depressed below its limited position, the arm 18 will rest against the free end of the accelerator pedal without exerting any substantial motion-retarding effect upon that pedal. It will also be seen that the lever 27 is so positioned that it can be manipulated by the fingers of a hand of the vehicle operator which is simultaneously engaging the steering wheel 28.

A spring wire 29 is positioned with its mid-portion wrapped about the pivot pin 17, one arm 30 of said wire bearing against the plate 15 and the other arm 31 bearing against the arm 18 in such a relation as to urge said arm to move in a counterclockwise direction. An adjustable abutment, such as a screw 33, is supported on unit 14 in such a position as to limit the movement of the arm 18 under the influence of the spring 29; and preferably the abutment 33 will be so adjusted as to position the arm 18 normally so that, when the accelerator pedal 10 engages the pin 20, a line drawn substantially normal to the accelerator pedal through the point of engagement thereof with the pin 20 will intersect the axis of the pin 17. Thus, pressure exerted upon the accelerator pedal will have no tendency to shift the arm 18 about its pivotal axis.

The operation of the organization above described will be clear without further explanation.

For use in connection with automobiles which are not provided with the direction-signal-actuating lever 27, I provide a saddle, indicated generally by the reference numeral 41, and intended to be supported upon the steering post 40. Said saddle may comprise a pair of arcuate arms 42 and 43 so shaped as to cooperate with the contour of the steering post of the vehicle to which it is to be applied, each of said arms preferably terminating in a laterally projecting ear 44 or 45. The saddle is so designed that the ears 44 and 45 will lie substantially in a median axial plane of the steering post 40, and will be substantially perpendicular to the contiguous portions of the steering post surface. Strip material of desired characteristics, such as adhesive tape or the like, indicated at 46 in Fig. 4, may now be used to secure the saddle 41 in place on the steering post, such material being wrapped about the ears 44 and 45 and about the portions of the steering post not engaged by the arms 42 and 43. Alternatively, of course, screws may be provided, passing through the arms 42 and 43 and into the steering post, but the tape, or the like, may be used in order to avoid use of metal or other material essential to the war effort.

The saddle 41 is formed to provide a platform 47 upon which is suitably secured a mounting 48 of desired characteristics, for movably supporting a lever 27'. The connector 23' is operatively secured to the lever 27' so that, when said lever 27' is moved in a counterclockwise direction, the blocker element will be shifted out of blocking relation with the accelerator pedal. Any desired means may be provided for releasably holding the lever 27' in selected position. In the illustrated embodiment of the invention, I have shown a sector 49 carried by the platform 47 and formed with one or more notches 49' cooperative with the lever 27' to hold the same in desired position.

The unit 14, as illustrated in Fig. 3, will preferably be formed of metal parts. Alternatively, the unit may be almost entirely formed of wood or synthetic materials. In Fig. 5, I have illustrated a wooden unit comprising a wooden block 50 formed with a slot the walls of which support a pivot pin 51. A wooden arm 52 is formed at its lower end with a bifurcated tongue 53 of reduced width, said tongue being received within the slot in the block 50, and journalled upon the pin 51. A spring 54 is wrapped about the pin between the furcations of the tongue 53, and one arm 55 thereof bears upon the outer surface of the arm 52, while the other end 56 thereof bears upon the end wall 57 of the block slot, so that the spring biases the arm 52 toward counterclockwise movement. Formation of the tongue 53 of course produces shoulders 63 on the arm 52; and those shoulders cooperate with the upper surface of the block 50 to limit the degree of movement of the arm 52 under the influence of the spring 54.

The outer end of the arm 52 is formed with a threaded socket 58 in which is adjustably mounted a threaded wooden pin 59 carrying a wooden lock nut 60. An eye 62, or other equivalent means, is carried by the arm 52 to provide an anchorage for a flexible connector like the element 23. Preferably, the wooden abutment pin 59 will carry at its outer end a metal wearplate 61 which may preferably be a furniture leg cap of the character provided with pointed tongues to be driven into the end of the pin 59 to secure said cap in place.

Preferably, the unit of Fig. 5 will be so installed with relation to the accelerator pedal 10 that a line F drawn normal to the accelerator pedal at the point of engagement of said pedal with the cap 61 will pass through the point of engagement of the shoulders 63 with the upper surface of block 50. Thereby, any downward force exerted upon the pedal will be transmitted to said relatively heavy shoulders 63, and will not have to be supported by the relatively weak furcations of the tongue 53 in their engagement with the pin 51.

In Fig. 6, I have illustrated a unit composed almost entirely of synthetic materials. The block 70 is closely similar to the block 50, but is formed of synthetic plastic material. The pivot pin 71 forms a pivotal mounting for the narrow bifurcated tongue 73 of the plastic arm 72. A spring 74 has its midportion wrapped about the pin 71 and lies between the furcations of the tongue 73, one end 75 thereof bearing upon the outer surface of the arm 72 and the other end 76 thereof bearing upon the end wall 77 of the slot formed in the block 70. The outer end of the arm 72 is provided with a threaded socket 78 in which is adjustably received a threaded pin 79 of plastic material, said pin carrying a locknut 80 of plastic material. An eye 82, or the like, forms an anchorage for a connector like the cord 23. In this form of the invention, movement of the arm 72 under the influence of spring 74 is limited by the engagement of a corner 83 of the tongue 73 with the floor 84, the plastic material having a crushing strength sufficient to make such an arrangement possible. It will be noted that the installation of the unit of Fig. 6 should preferably be such as to cause a line F'' drawn substantially normal to the accelerator pedal at the point of engagement of that pedal with the end of the pin 79 to pass through the corners 83.

I claim as my invention:

1. For use with a throttle actuator of an automotive vehicle, an arm pivotally mounted and yieldably biased toward a position in the path of engine-accelerating movement of such actuator, an abutment element carried by said arm and adjustable with respect thereto to vary the position at which movement of such actuator will be blocked by said arm, and means having a one-way motion-transmitting connection with said arm and manipulable by an operator of the vehicle to swing said arm out of the path of movement of such actuator.

2. For use with a pivotally mounted accelerator pedal of an automotive vehicle, an arm pivotally mounted near the free end of such pedal and yieldably biased toward a position beneath said free end of such pedal, an abutment element carried by said arm and normally held thereby in blocking relation beneath said pedal end, said abutment element being adjustable with respect to said arm to vary the position at which downward movement of said pedal end will normally be blocked, and means having a one-way motion-transmitting connection with said arm and for swinging said arm about its pivot to remove said abutment element from blocking relation with said pedal end.

3. For use with a pivotally mounted accelerator pedal of an automotive vehicle, an arm pivotally mounted near the free end of such pedal and yieldably biased toward a position beneath said free end of such pedal, an abutment element carried by said arm and normally held thereby in blocking relation beneath said pedal end, said abutment element being adjustable with respect to said arm to vary the position at which downward movement of said pedal end will normally be blocked, and means manipulable by the vehicle operator and having a one-way motion-transmitting connection with said arm for swinging said arm about its pivot to remove said abutment element from blocking relation with said pedal end.

4. For use with a pivotally mounted accelerator pedal of an automotive vehicle, an arm pivotally mounted near the free end of such pedal and yieldably biased toward a position beneath said free end of such pedal, an abutment element carried by said arm and normally held thereby in blocking relation beneath said pedal end, said abutment element being adjustable with respect to said arm to vary the position at which downward movement of said pedal end will normally be blocked, and means manipulable by the vehicle operator and having a one-way motion-transmitting connection with said arm for swinging said arm about its pivot to remove said abutment element from blocking relation with said pedal end, said arm, when in withdrawn position, presenting a smooth, relatively frictionless face to said pedal end, whereby upon return of said operator-manipulable means to normal position during abnormal depression of said pedal end, said arm will rest yieldably against said pedal end without offering material resistance to upward movement of said pedal end, and whereby, when said pedal end, under such conditions, is moved upwardly beyond the position at which it is normally blocked, said arm will swing automatically into blocking relation with said pedal end.

5. In combination, in an automotive vehicle, an accelerator pedal, an adjustable abutment normally positioned to block speed-increasing movement of said pedal at a predetermined point corresponding to a preselected vehicle speed, a turn-indicating signal mechanism including an actuating element therefor, and means connecting said actuating element to shift said adjustable element out of pedal-blocking position when said actuating element is moved to the position to cause said signal mechanism to warn of a contemplated left turn.

6. In combination, in an automotive vehicle, an accelerator pedal, an adjustable abutment normally positioned to block speed-increasing movement of said pedal at a predetermined point corresponding to a preselected vehicle speed, a turn-indicating signal mechanism including an actuating element therefor, and means providing a one-way motion-transmitting connection between said actuating element and said adjustable element operable to shift said adjustable element out of pedal-blocking position when said actuating element is moved to the position to cause said signal mechanism to warn of a contemplated left turn.

7. For use with the accelerator pedal of an automotive vehicle, a blocking stop member comprising a pivotally mounted arm, an abutment member carried by said arm and adjustable with respect thereto on a line substantially perpendicular to the pivotal axis of said arm, spring means resisting pivotal movement of said arm in one direction, and means limiting movement of said arm in the opposite direction to stop the same in a position in which a line substantially normal to such pedal at the point of contact between said abutment and such pedal will intersect the pivotal axis of said arm.

8. For use with the accelerator pedal of an automotive vehicle, a blocking stop member comprising a pivotally mounted arm, a threaded pin threadedly mounted in the free end of said arm and adjustable with respect thereto on a line substantially perpendicular to the pivotal axis of said arm, a lock nut threadedly mounted on said pin and engageable with said arm, spring means biasing said arm toward a position in blocking relation to said pedal, and means operable to swing said arm against the tendency of said spring means but inoperable to transmit any force to said arm tending to move the same in the direction of its bias.

9. For use with the accelerator pedal of an automotive vehicle, a blocking stop member comprising a pivotally mounted arm, an abutment member carried by said arm and adjustable with respect thereto on a line substantially perpendicular to the pivotal axis of said arm, spring means resisting pivotal movement of said arm in one direction, abutment means on said arm and engageable with a stop to limit movement of said arm in the opposite direction, the position of said arm being such, when said abutment means engages said stop, that a line substantially normal to said pedal at its point of engagement with said abutment member passes through the point of engagement of said abutment means with said stop.

10. For use with the accelerator pedal of an automotive vehicle, a blocking stop member comprising a pivotally mounted arm, an abutment member carried by said arm and adjustable with respect thereto on a line substantially perpendicular to the pivotal axis of said arm, spring means resisting pivotal movement of said arm in one direction, abutment means on said arm and engageable with a stop to limit movement of said arm in the opposite direction, the position of said arm being such, when said abutment means engages said stop, that a line substantially normal to said pedal at its point of engagement with said abutment member falls on the same side of the pivotal axis of said arm with the point of engagement of said abutment means with said stop.

11. For use with the accelerator pedal of an automotive vehicle, a blocking stop member comprising a pivotally mounted non-metallic arm, a non-metallic threaded pin threadedly mounted in the free end of said arm and adjustable with respect thereto on a line substantially perpendicular to the pivotal axis of said arm, a non-metallic lock nut threadedly mounted on said pin and engageable with said arm, spring means biasing said arm toward a position in blocking relation with said pedal, wear-resistant means carried by said pin for engagement by said pedal, and means operable to swing said arm against the tendency of said spring means out of blocking relation with said pedal.

12. For use with the accelerator pedal of an automotive vehicle, a blocking stop member comprising a pivotally mounted arm, an abutment member carried by said arm and adjustable with respect thereto on a line substantially perpendicular to the pivotal axis of said arm, spring means resisting pivotal movement of said arm in one direction, and means limiting movement of said arm in the opposite direction to stop the same in a position in which the angle included between that surface of such pedal engaging said arm and a line connecting the pivotal axis of said arm with the point of engagement between said arm and said pedal surface, upon the side of said arm facing toward the direction of limited movement thereof, is at least 90°.

EARNEST H. PATRICK.